(12) United States Patent
Kim et al.

(10) Patent No.: US 12,397,765 B2
(45) Date of Patent: Aug. 26, 2025

(54) ELECTRONIC PARKING BRAKE CONTROL SYSTEM AND CONTROL METHOD THEREOF

(71) Applicant: HL MANDO CORPORATION, Gyeonggi-do (KR)

(72) Inventors: Yutae Kim, Gyeonggi-do (KR); Sehyun Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 56 days.

(21) Appl. No.: 18/412,326

(22) Filed: Jan. 12, 2024

(65) Prior Publication Data

US 2025/0033623 A1 Jan. 30, 2025

(30) Foreign Application Priority Data

Jul. 25, 2023 (KR) ........................ 10-2023-0097029

(51) Int. Cl.
*B60T 13/74* (2006.01)
*B60T 17/22* (2006.01)

(52) U.S. Cl.
CPC .......... B60T 13/741 (2013.01); B60T 17/221 (2013.01); *B60T 2270/404* (2013.01)

(58) Field of Classification Search
CPC ....... B60T 17/22; B60T 2270/402; B60T 8/17
See application file for complete search history.

(56) References Cited

U.S. PATENT DOCUMENTS

| | | | | |
|---|---|---|---|---|
| 2005/0285442 A1* | 12/2005 | Tsukasaki | ............... | B60T 13/74 303/3 |
| 2013/0138316 A1* | 5/2013 | Koyama | ............... | B60T 8/1755 701/70 |
| 2013/0253793 A1* | 9/2013 | Lee | ............... | B60W 50/029 701/70 |
| 2017/0210361 A1* | 7/2017 | Kotera | ............... | F16D 55/226 |
| 2017/0240147 A1* | 8/2017 | Kotera | ............... | B60T 1/067 |
| 2018/0029577 A1* | 2/2018 | Beauvais | ............... | B60T 8/176 |
| 2019/0168730 A1* | 6/2019 | Park | ............... | G07C 5/0808 |
| 2019/0248354 A1* | 8/2019 | Andrea | ............... | B60T 13/741 |
| 2021/0009095 A1* | 1/2021 | Kim | ............... | B60W 10/184 |
| 2021/0078557 A1* | 3/2021 | Kobune | ............... | B60T 13/741 |
| 2021/0122348 A1* | 4/2021 | Leiber | ............... | B60T 13/66 |
| 2022/0111824 A1* | 4/2022 | Kim | ............... | B60T 7/042 |
| 2023/0331205 A1* | 10/2023 | Chai | ............... | F15B 15/26 |
| 2023/0391303 A1* | 12/2023 | Kim | ............... | B60T 8/92 |
| 2023/0415717 A1* | 12/2023 | Kim | ............... | B60T 13/662 |
| 2024/0101088 A1* | 3/2024 | Nam | ............... | B60T 8/94 |

FOREIGN PATENT DOCUMENTS

| | | |
|---|---|---|
| JP | 2003-72527 | 3/2003 |
| JP | 2019-167053 | 10/2019 |
| KR | 10-2019-0066305 | 6/2019 |

\* cited by examiner

*Primary Examiner* — Long T Tran

(74) *Attorney, Agent, or Firm* — WOMBLE BOND DICKINSON (US) LLP

(57) ABSTRACT

An electronic parking brake control system according to an embodiment includes: an electronic parking brake installed in a rear wheel of a vehicle and including a braking device, a driving valve configured to operate the braking device, and a Rear Electronic Control Unit (ECU) configured to control an operation of the driving valve; a Logic ECU configured to control the electronic parking brake by controlling the Rear ECU; and a Domain Control Unit (DCU) configured to control the electronic parking brake in parallel with the Logic ECU.

20 Claims, 6 Drawing Sheets a) OPERATION

ELECTRONIC PARKING BRAKE CONTROL SYSTEM AND CONTROL METHOD THEREOF

CROSS-REFERENCE TO RELATED APPLICATION(S)

This application is based on and claims priority under 35 U.S.C. § 119 to Korean Patent Application No. 10-2023-0097029, filed on Jul. 25, 2023, in the Korean Intellectual Property Office, the disclosure of which is incorporated by reference herein in its entirety.

BACKGROUND

1. Field

The disclosure relates to an electronic parking brake control system and a control method thereof.

2. Description of the Related Art

A brake system is an apparatus that decelerates and stops a vehicle in motion and maintains the vehicle in a stopped state. The brake system includes a parking brake that decelerates and stops a vehicle in motion and maintains the vehicle in a stopped state.

The parking brake maintains the stopped state of the wheels by pulling the parking cable by the control of a lever located to one side of the driver seat inside the vehicle to provide a braking force to the wheels connected to the parking cable, and removes the braking force provided to the wheels by releasing the lever to release the parking cable.

Because the parking brake operates only by a driver's intention, the driver should control the lever whenever parking or starting driving, which has caused the driver's great inconvenience in use. For this reason, an Electronic Parking Brake (EPB) system for automatically operating the parking brake by the motor according to the operation state of the vehicle has been developed.

The EPB system operates or releases the parking brake and secures braking stability for emergency situations by a driver's manual control mode and automatically in conjunction with a Hydraulic Electronic Control Unit (HECU), an engine Electronic Control Unit (ECU), a Traction Control Unit (TCU), etc. through a switch control.

The EPB system is configured by integrating an ECU, a motor, a gear, a parking cable, a braking force sensor, etc. into one body. The ECU receives related information from the HECU, ECU, TCU, etc. through a Controller Area Network (CAN), understands a driver's intention, and then drives the motor. Then, the motor is driven to operate the gear, the parking cable is pulled by the operation of the gear to provide a braking force to the wheels, and accordingly, the vehicle is maintained in a stable state.

SUMMARY

It is an embodiment of the disclosure to provide an electronic parking brake control system capable of being controlled by a Domain Control Unit (DCU) together with a disc and a Logic Electronic Control Unit (ECU).

It is an embodiment of the disclosure to provide a control method of an electronic parking brake in which a DCU intervenes in operation at a necessary moment while monitoring a parking brake system in real time.

Additional aspects of the disclosure will be set forth in part in the description which follows and, in part, will be obvious from the description, or may be learned by practice of the disclosure.

In accordance with an aspect of the disclosure, an electronic parking brake control system may include: an electronic parking brake installed in a rear wheel of a vehicle and including a braking device, a driving valve configured to operate the braking device, and a Rear Electronic Control Unit (ECU) configured to control an operation of the driving valve; a Logic ECU configured to control the electronic parking brake by controlling the Rear ECU; and a Domain Control Unit (DCU) configured to control the electronic parking brake in parallel with the Logic ECU.

According to an embodiment, the DCU may be configured to monitor a state of the electronic parking brake in real time.

According to an embodiment, the DCU may be configured to start controlling the electronic parking brake based on the electronic parking brake being in a failure state.

According to an embodiment, the DCU may be configured to control the driving valve based on the driving valve being not controlled by the Rear ECU.

According to an embodiment, the DCU may be configured to control the driving valve based on the Rear ECU being in a failure state.

According to an embodiment, the DCU may be configured to convert the driving valve into a release mode based on the driving valve being in a parking mode.

According to an embodiment, the Rear ECU may be configured to preferentially apply a signal received from the DCU among the Logic ECU and the DCU.

According to an embodiment, the Logic ECU may be configured to be integrated into a Main ECU of the vehicle to form a part of the Main ECU.

According to an embodiment, the braking device may include a driving motor and a drum brake configured to operate by the driving motor, and the Rear ECU may be configured to drive the driving motor by operating the driving valve.

According to an embodiment, the driving valve may be a solenoid valve.

In accordance with an aspect of the disclosure, a control method of an electronic parking brake including a braking device, a driving valve configured to operate the braking device, and a Rear Electronic Control Unit (ECU) configured to control an operation of the driving valve, may include: operation a) in which a Logic ECU controls the electronic parking brake; operation b) in which a Domain Control Unit (DCU) monitors a state of the electronic parking brake in real time; and operation c) in which the DCU controls the electronic parking brake in preference to the Logic ECU.

According to an embodiment, the operation c) may further include operation in which the DCU starts controlling the electronic parking brake based on the electronic parking brake being in a failure state.

According to an embodiment, the operation c) may further include operation in which the DCU controls the driving valve based on the driving valve being not controlled by the Rear ECU.

According to an embodiment, the operation c) may be performed in a case in which the Rear ECU is in a failure state or a case in which a signal from the Rear ECU is not transferred to the driving valve.

According to an embodiment, the operation c) may further include operation in which the DCU converts the driving valve into a release mode based on the driving valve being in a parking mode.

The operation a) may include: operation in which the Logic ECU issues an operation command instructing an operation of the driving valve to the Rear ECU; and operation in which the Rear ECU operates the driving valve in a parking mode.

According to an embodiment, the operation a) may include: operation in which the Rear ECU transmits, to the DCU, a signal indicating that the Logic ECU has issued an operation command; and operation in which the Rear ECU transmits, to the DCU, a signal indicating that the driving valve has completed an operation.

According to an embodiment, the operation c) may include operation in which the DCU operates the driving valve based on the driving valve having not operated.

According to an embodiment, the operation c) may include operation in which the DCU maintains a standby state based on the driving valve operating.

According to an embodiment, the operation c) may include operation in which the DCU operates the driving valve based on a Main ECU of a vehicle, issuing an emergency braking command to the DCU.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
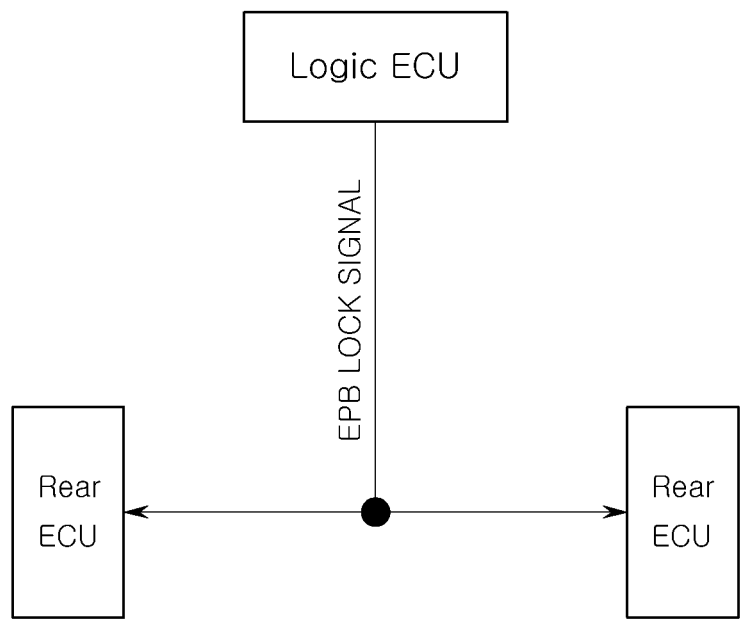
FIG. 1 is a block diagram showing an electronic parking brake control system according to related technology.

Hereinafter, embodiments of the disclosure will be described in detail with reference to the accompanying drawings. The following embodiments are provided to transfer the concepts of the disclosure to one of ordinary skill in the technical art to which the disclosure belongs. However, the disclosure is not limited to these embodiments, and may be embodied in another form. In the drawings, parts that are irrelevant to the descriptions may be not shown in order to clarify the disclosure, and also, for easy understanding, the sizes of components are more or less exaggeratedly shown.

FIG. 1 is a block diagram showing an electronic parking brake control system according to related technology.

Referring to FIG. 1, a Logic Electronic Control Unit (ECU) which is in charge of Logic may apply an operation command for an Electronic Parking Brake (EPB). Then, a Rear ECU which is in charge of braking rear wheels may apply a braking force to the wheels of a vehicle by using a motor. In this state, to maintain a parking state, the brake may need to be locked by using a valve device. In contrast, to release the parking state, the Logic ECU may apply an operation command to the valve device to release the brake.

Upon occurrence of a failure in the Logic ECU, the entire EPB system may malfunction, which may make operations of the vehicle impossible.

Figure 2:
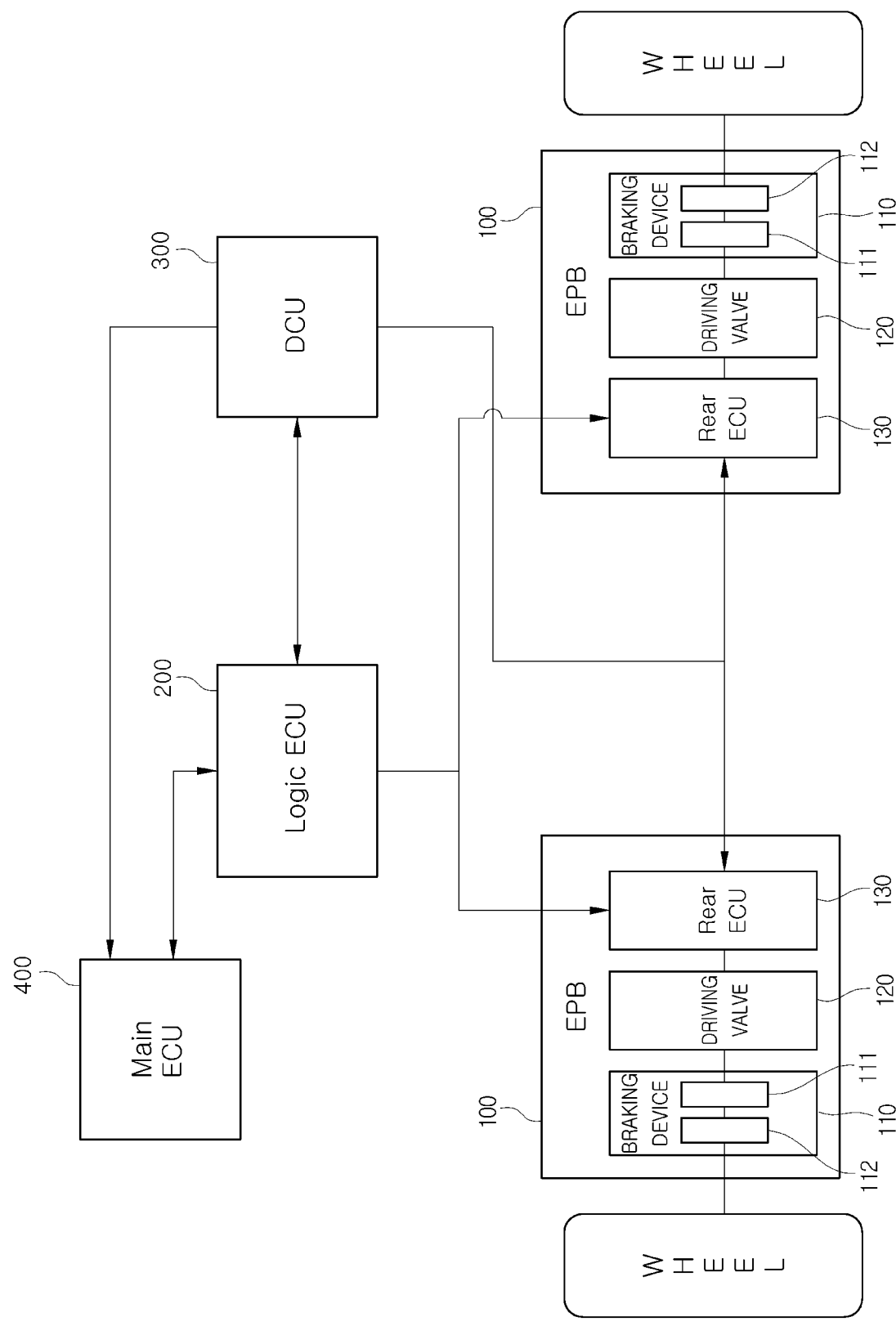
FIG. 2 is a block diagram showing an electronic parking brake control system according to an embodiment of the disclosure.

FIG. 2 is a block diagram showing an electronic parking brake control system 1 according to an embodiment of the disclosure.

The electronic parking brake control system 1 may include: an electronic parking brake 100 installed in a rear wheel of a vehicle and including a braking device 110, a driving valve 120 for operating the braking device 110, and a Rear ECU 130 configured to control an operation of the driving valve 120; a Logic ECU 200 configured to control the electronic parking brake 100 by controlling the Rear ECU 130; and a Domain Control Unit (DCU) 300 configured to control the electronic parking brake 100 in parallel with the Logic ECU 200.

An ECU is an electronic controller for controlling states of an engine, an automatic transmission, an anti-lock braking system (ABS), etc. of a vehicle through a computer. Particularly, the ECU precisely controls core functions of the engine, such as ignition timing, fuel injection, idling, limit settings, etc. Also, with the development of vehicle and computer performance, the ECU functions to control all systems of the vehicle, such as the driving system, the braking system, and the steering system, in addition to the control of the automatic transmission.

A DCU is a system for integrating, signal-processing, and controlling individual domains (sensors). The DCU functions to make various decisions by calculating information collected through various sensors functioning as a brain constituting an autonomous driving system. The DCU determines a driving direction, speed, stop/start, etc. of the vehicle by comprehensively analyzing various traffic information obtained from a lidar, a radar, and a camera.

The Logic ECU 200 may be integrated into a Main ECU 400 of the vehicle to constitute a part of the main ECU 400. The Logic ECU 200 may be configured as a separate device from the Main ECU 400, unlike FIG. 1, and may be controlled through the Main ECU 400 or by a method of receiving a driver's command through a separate inputter.

The braking device 110 may include a driving motor 111, and a drum brake 112 that operates by the driving motor 111, and the Rear ECU 130 may drive the driving motor 111 by operating the driving valve 120. The drum brake 112 may provide a friction force to the rear wheel to prevent the rear wheel from rotating. For example, the driving valve 120 may be a solenoid valve.

The logic ECU 200 may transfer an EPB lock signal to each of electronic parking brakes 100 positioned at both wheels. The DCU 300 may transfer a direct operation signal for EPB locking to each of the electronic parking brakes 100 positioned at both the wheels.

The DCU 300 may monitor a state of the electronic parking brake 100 in real time. Also, the DCU 300 may determine whether the electronic parking brake 100 operates based on a signal sent from the Logic ECU 200, because the DCU 300 is capable of identifying a signal sent from the Logic ECU 200 to the electronic parking brake 100.

When the DCU 300 detects a failure state of the electronic parking brake 100, the DCU 300 may start controlling the electronic parking brake 100. For example, there may be a case in which the electronic parking brake 100 maintains a parking state despite a parking release signal sent from the Logic ECU 200. In this case, the DCU 300 may intervene.

In contrast, when the electronic parking brake 100 releases a parking mode despite a parking mode signal sent from the Logic ECU 200, the DCU 300 may intervene.

When the DCU 300 determines that the driving valve 120 is not controlled by the Rear ECU 130, the DCU 300 may itself control the driving valve 120. That is, when the driving valve 120 does not operate in response to a signal sent from the Rear ECU 130 to the driving valve 120 due to a cause of a disconnection, damage of a circuit board, submersion, etc., the DCU 300 may itself operate the driving valve 120.

The DCU 300 may monitor an operation state of the Rear ECU 130. In this case, when the DCU 300 determines that the Rear ECU 130 is in a failure state, the DCU 130 may itself control the driving valve 120 regardless of whether any signal is transferred between the Rear ECU 130 and the driving valve 120.

As such, while the DCU 300 itself controls the driving valve 120, the DCU 300 may convert, when the driving valve 120 is in a parking mode, the driving valve 120 into a release mode.

The Rear ECU 130 may distinguish a signal sent from the DCU 300 from a signal sent from the Logic ECU 200. The Rear ECU 130 may preferentially apply a signal received from the DCU 300 among the Logic ECU 200 and the DCU 300. For example, when the Logic ECU 200 sends a signal instructing conversion into the parking mode to the Rear ECU 130 and the DCU 300 sends a signal instructing conversion into the release mode to the Rear ECU 130, the Rear ECU 130 may preferentially apply the signal sent from the DCU 300.

Figure 3:
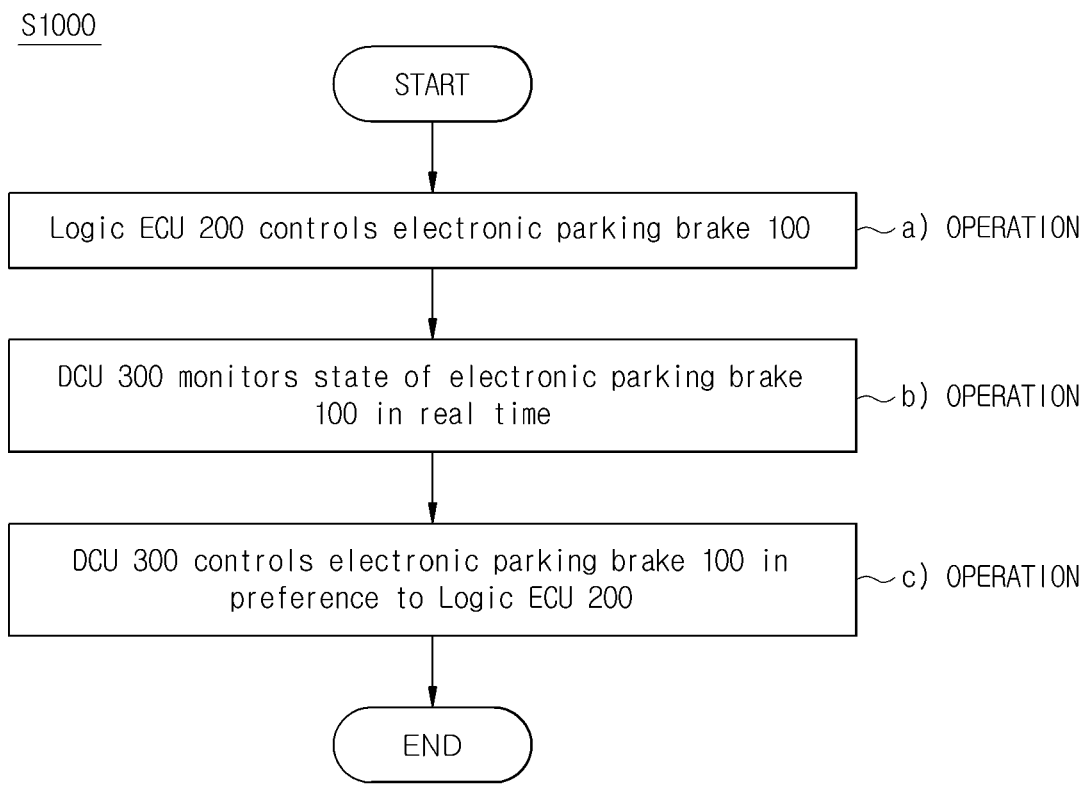
FIG. 3 is a flowchart showing a control method of an electronic parking brake according to an embodiment of the disclosure.
Figure 4:
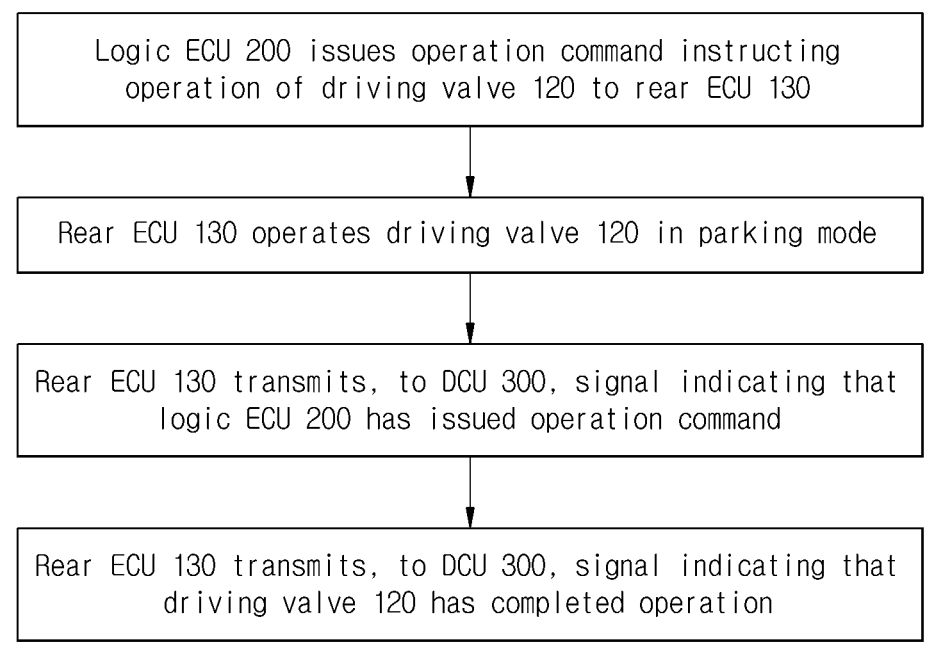
FIG. 4 is a flowchart for describing operation a) in FIG. 3.
Figure 5:
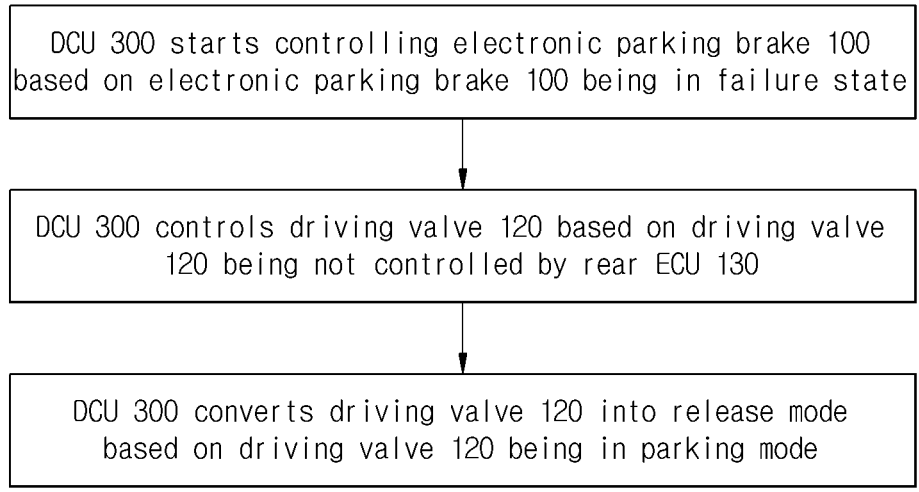
FIG. 5 is a flowchart for describing operation c) in FIG. 3.
Figure 6:
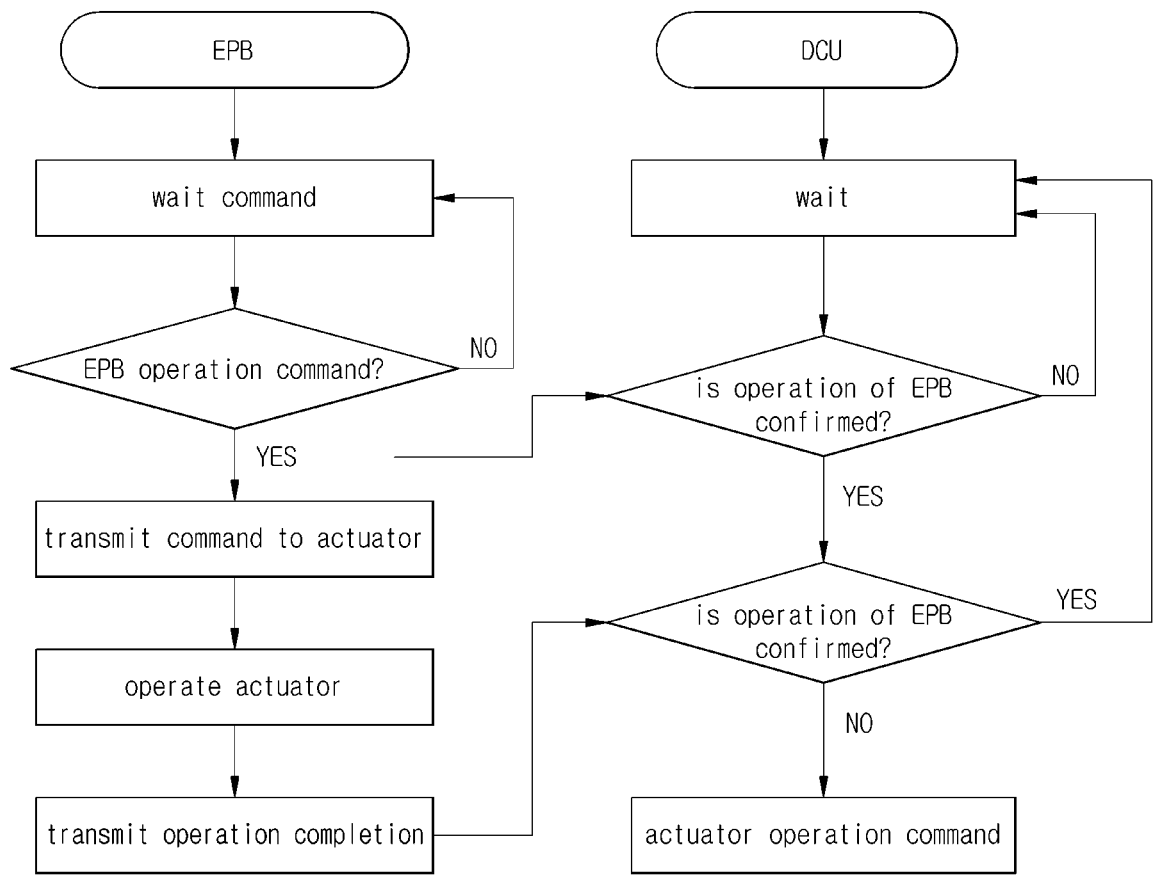
FIG. 6 is a flowchart for describing the control method of the electronic parking brake, shown in FIG. 3.

FIG. 3 is a flowchart showing a control method S1000 of the electronic parking brake 100 according to an embodiment of the disclosure. FIG. 4 is a flowchart for describing operation a) in FIG. 3. FIG. 5 is a flowchart for describing operation c) in FIG. 3, FIG. 6 is a flowchart for describing the control method of the electronic parking brake 100, shown in FIG. 3.

The electronic parking brake 100 may be the electronic parking brake described above with reference to FIG. 2, and descriptions about the same content as that described above will be omitted.

The control method S1000 of the electronic parking brake 100 may include operation a) in which the Logic ECU 200 controls the electronic parking brake 100; operation b) in which the DCU 200 monitors a state of the electronic parking brake 100 in real time; and operation c) in which the DCU 300 controls the electronic parking brake 100 in preference to the Logic ECU 200.

Referring to FIG. 5, operation c) may include operation in which the DCU 300 starts controlling the electronic parking brake 100 when the DCU 300 determines that the electronic parking brake 100 is in a failure state; operation in which the DCU 300 itself controls the driving valve 120 when the driving valve 120 is not controlled by the rear ECU 130; and operation in which the DCU 300 converts the driving valve 120 into the release mode when the driving valve 120 is in the parking mode.

Operation c) may be performed in a case in which the Rear ECU 130 is in a failure state or a case in which a signal from the Rear ECU 130 is not transferred to the driving valve 120.

Hereinafter, an operational flow of the control method S1000 of the electronic parking brake 100 will be described with reference to FIG. 6.

Referring to FIGS. 4 and 6, operation a) may include operation in which the Logic ECU 200 issues an operation command instructing an operation of the driving valve 120 to the Rear ECU 130; and operation in which the Rear ECU 130 operates the driving valve 120 in the parking mode.

Also, operation a) may include operation in which the Rear ECU 130 transmits, to the DCU 300, a signal indicating that the Logic ECU 200 has issued an operation command; and operation in which the Rear ECU 130 transmits, to the DCU 300, a signal indicating that the driving valve 120 has completed an operation.

Operation c) may include operation in which the DCU 300 itself operates the driving valve 120 when the DCU 300 determines that the driving valve 120 has not operated.

Also, operation c) may include operation in which the DCU 300 maintains a standby state when the DCU 300 determines that the driving valve 120 operates.

Also, operation c) may include operation in which the DCU 300 operates the driving valve 120 when the main ECU 400 of the vehicle issues an emergency braking command to the DCU 300.

According to an embodiment, when a failure occurs in the Logic ECU to cause a failure of the EPB system and accordingly, the vehicle is unable to operate, the DCU may operate to enable the vehicle to operate even in a failure state. That is, the DCU may operate to release a parking lock state caused by damage of the Rear ECU.

Also, because the DCU itself operates the solenoid valve performing EPB locking, a system capable of controlling the solenoid valve may be added outside the EPB.

In addition, because the DCU monitors a state of the EPB being a subsystem, the DCU may detect a failure of the EPB. That is, by including the DCU as a part of a system capable of performing a parking lock, an operation disabled state of the vehicle may be released.

Because the electronic parking brake control system according to the current embodiment is controllable by the DCU, the electronic parking brake control system may release a locked state of the parking brake even when the Rear ECU breaks down.

In the control method of the electronic parking brake according to the current embodiment, because the DCU monitors a state of the electronic parking brake in real time, the DCU may itself operate the driving valve to release an operation disabled state of the vehicle.

So far, although the disclosure has been described by the limited embodiments and drawings, the disclosure is not limited to these, and various corrections and modifications can be made by one of ordinary skill in the technical art to which the disclosure belongs within the technical concepts of the disclosure and equivalents of the appended claims.

What is claimed is:

1. An electronic parking brake control system comprising:
an electronic parking brake installed in a rear wheel of a vehicle and including a braking device, a driving valve configured to operate the braking device, and a Rear Electronic Control Unit (ECU) configured to control an operation of the driving valve;
a Logic ECU configured to control the electronic parking brake by controlling the Rear ECU; and
a Domain Control Unit (DCU) configured to control the electronic parking brake in parallel with the Logic ECU.

2. The electronic parking brake control system of claim 1, wherein the DCU is configured to monitor a state of the electronic parking brake in real time.

3. The electronic parking brake control system of claim 2, wherein the DCU is configured to start controlling the electronic parking brake based on the electronic parking brake being in a failure state.

4. The electronic parking brake control system of claim 2, wherein the DCU is configured to control the driving valve based on the driving valve being not controlled by the Rear ECU.

5. The electronic parking brake control system of claim 4, wherein the Logic ECU is configured to be integrated into a Main ECU of the vehicle to form a part of the Main ECU.

6. The electronic parking brake control system of claim 2, wherein the DCU is configured to control the driving valve based on the Rear ECU being in a failure state.

7. The electronic parking brake control system of claim 6, wherein the DCU is configured to convert the driving valve into a release mode based on the driving valve being in a parking mode.

8. The electronic parking brake control system of claim 2, wherein the Rear ECU is configured to preferentially apply a signal received from the DCU among the Logic ECU and the DCU.

9. The electronic parking brake control system of claim 2, wherein the braking device includes a driving motor and a drum brake configured to operate by the driving motor, and
the Rear ECU is configured to drive the driving motor by operating the driving valve.

10. The electronic parking brake control system of claim 9, wherein the driving valve is a solenoid valve.

11. A control method of an electronic parking brake including a braking device, a driving valve configured to operate the braking device, and a Rear Electronic Control Unit (ECU) configured to control an operation of the driving valve, the control method comprising:
operation a) in which a Logic ECU controls the electronic parking brake;
operation b) in which a Domain Control Unit (DCU) monitors a state of the electronic parking brake in real time; and
operation c) in which the DCU controls the electronic parking brake in preference to the Logic ECU.

12. The control method of claim 11, wherein the operation c) further includes operation in which the DCU starts controlling the electronic parking brake based on the electronic parking brake being in a failure state.

13. The control method of claim 12, wherein the operation c) further includes operation in which the DCU controls the driving valve based on the driving valve being not controlled by the Rear ECU.

14. The control method of claim 13, wherein the operation c) is performed in a case in which the Rear ECU is in a failure state or a case in which a signal from the Rear ECU is not transferred to the driving valve.

15. The control method of claim 13, wherein the operation c) further includes operation in which the DCU converts the driving valve into a release mode based on the driving valve being in a parking mode.

16. The control method of claim 11, wherein the operation a) includes:
operation in which the Logic ECU issues an operation command instructing an operation of the driving valve to the Rear ECU; and
operation in which the Rear ECU operates the driving valve in a parking mode.

17. The control method of claim 16, wherein the operation a) includes:
operation in which the Rear ECU transmits, to the DCU, a signal indicating that the Logic ECU has issued an operation command; and
operation in which the Rear ECU transmits, to the DCU, a signal indicating that the driving valve has completed an operation.

18. The control method of claim 17, wherein the operation c) includes operation in which the DCU operates the driving valve based on the driving valve having not operated.

19. The control method of claim 17, wherein the operation c) includes operation in which the DCU maintains a standby state based on the driving valve operating.

20. The control method of claim 11, wherein the operation c) includes operation in which the DCU operates the driving valve based on a Main ECU of a vehicle, issuing an emergency braking command to the DCU.

* * * * *